US012651822B2

(12) United States Patent
Ryu et al.

(10) Patent No.: US 12,651,822 B2
(45) Date of Patent: Jun. 9, 2026

(54) ANTENNA STACK STRUCTURE AND DISPLAY DEVICE INCLUDING THE SAME

(71) Applicant: DONGWOO FINE-CHEM CO., LTD., Jeollabuk-do (KR)

(72) Inventors: Han Sub Ryu, Gyeongsangbuk-do (KR); Yu Mi Ahn, Daegu (KR); Ho Dong Yoon, Gyeonggi-do (KR); Won Hee Lee, Incheon (KR); Jae Hyun Lee, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 146 days.

(21) Appl. No.: 17/884,966

(22) Filed: Aug. 10, 2022

(65) Prior Publication Data

US 2022/0393335 A1 Dec. 8, 2022

Related U.S. Application Data

(63) Continuation of application No. PCT/KR2021/001639, filed on Feb. 8, 2021.

(30) Foreign Application Priority Data

Feb. 10, 2020 (KR) ........................ 10-2020-0015473
Feb. 20, 2020 (KR) ........................ 10-2020-0020767

(51) Int. Cl.
*H01Q 1/38* (2006.01)
*H01Q 1/22* (2006.01)
*H01Q 1/36* (2006.01)

(52) U.S. Cl.
CPC ................ *H01Q 1/22* (2013.01); *H01Q 1/36* (2013.01)

(58) Field of Classification Search
CPC H01Q 1/22; H01Q 1/36; H01Q 9/045; H01Q 1/1271; H01Q 1/243; H01Q 1/38; H01Q 1/40; G02B 5/30; G06F 3/041; G06F 3/0412
See application file for complete search history.

(56) References Cited

U.S. PATENT DOCUMENTS 9,178,572 B1 * 11/2015 Zhang ...................... H04B 5/77
2004/0239568 A1 * 12/2004 Masutani ............ H01Q 9/0464 343/846

(Continued)

FOREIGN PATENT DOCUMENTS

CN 109849106 A * 6/2019
CN 110718739 A 1/2020

(Continued)

OTHER PUBLICATIONS

International Search Report for PCT/KR2021/001639 mailed on May 26, 2021.

*Primary Examiner* — Dimary S Lopez Cruz
*Assistant Examiner* — Bamidele A Immanuel
(74) *Attorney, Agent, or Firm* — The PL Law Group, PLLC

(57) ABSTRACT

An antenna stack structure according to an embodiment includes a protective layer, and an antenna electrode layer formed directly on a surface of the protective layer. The antenna electrode layer includes a first electrode layer and a second electrode layer having a lower reflectance than that of the first electrode layer. A visual recognition of electrode are prevented by the second electrode layer.

18 Claims, 5 Drawing Sheets

(56) References Cited

U.S. PATENT DOCUMENTS

| | | | | |
|---|---|---|---|---|
| 2009/0219259 | A1* | 9/2009 | Kwon | G06F 3/0445 345/173 |
| 2010/0013745 | A1* | 1/2010 | Kim | H10K 59/40 345/76 |
| 2011/0108870 | A1* | 5/2011 | Jaeger | H01L 33/483 257/E33.057 |
| 2012/0086669 | A1* | 4/2012 | Kim | G06F 3/0445 345/174 |
| 2013/0059532 | A1* | 3/2013 | Mahanfar | H01Q 1/243 343/702 |
| 2013/0267170 | A1* | 10/2013 | Chong | H01Q 1/243 455/41.1 |
| 2014/0104157 | A1* | 4/2014 | Burns | H01Q 1/38 343/702 |
| 2014/0106684 | A1* | 4/2014 | Burns | H01Q 21/28 29/601 |
| 2015/0146436 | A1* | 5/2015 | Heo | F21V 7/09 362/346 |
| 2016/0190678 | A1* | 6/2016 | Hong | H01Q 1/44 343/700 MS |
| 2016/0240741 | A1* | 8/2016 | Kuo | H10H 20/835 |
| 2016/0344089 | A1* | 11/2016 | Baik | H01Q 1/273 |
| 2016/0379573 | A1* | 12/2016 | de Greef | G09G 3/348 345/212 |
| 2017/0093021 | A1* | 3/2017 | Kim | H01Q 1/243 |
| 2017/0093023 | A1* | 3/2017 | Cai | H01Q 1/243 |
| 2017/0123533 | A1* | 5/2017 | Jo | G06F 3/041 |
| 2017/0179567 | A1* | 6/2017 | Zou | H01Q 1/364 |
| 2018/0067592 | A1* | 3/2018 | Kimura | G06F 3/047 |
| 2018/0102588 | A1* | 4/2018 | Szini | H01Q 1/241 |
| 2018/0188432 | A1* | 7/2018 | Choi | G02B 5/3058 |
| 2019/0036208 | A1* | 1/2019 | Yamagishi | G06K 19/0723 |
| 2019/0042811 | A1* | 2/2019 | Yamagishi | H01Q 7/00 |
| 2019/0102039 | A1* | 4/2019 | Uehara | G06V 10/955 |
| 2019/0214374 | A1* | 7/2019 | Huang | H01L 25/0753 |
| 2019/0220123 | A1* | 7/2019 | Kanaya | G06F 3/0412 |
| 2019/0237875 | A1* | 8/2019 | Yamagishi | G06K 19/07773 |
| 2019/0326682 | A1* | 10/2019 | Qin | H01Q 1/48 |
| 2020/0019264 | A1* | 1/2020 | Kadota | G06F 3/0445 |
| 2020/0021008 | A1* | 1/2020 | Yong | H01Q 21/005 |
| 2020/0076035 | A1* | 3/2020 | Huh | H01P 3/082 |
| 2020/0119438 | A1* | 4/2020 | Maruyama | H01Q 1/44 |
| 2020/0194896 | A1* | 6/2020 | Huh | H01Q 1/48 |
| 2020/0251807 | A1* | 8/2020 | Oh | H01Q 9/0407 |
| 2021/0141426 | A1* | 5/2021 | Kim | H01Q 1/46 |

FOREIGN PATENT DOCUMENTS

| | | | | | |
|---|---|---|---|---|---|
| CN | 215989229 | U | | 3/2022 | |
| EP | 2 722 853 | A1 | | 4/2014 | |
| KR | 10-2013-0113222 | A | | 10/2013 | |
| KR | 20140075405 | A | * | 6/2014 | H04B 1/40 |
| KR | 20150104953 | A | * | 9/2015 | G06F 3/0412 |
| KR | 10-2016-0137315 | A | | 11/2016 | |
| KR | 10-2018-0097212 | A | | 8/2018 | |
| KR | 10-2018-0099518 | A | | 9/2018 | |
| KR | 10-2019-0018796 | A | | 2/2019 | |
| KR | 10-2019-0019802 | A | | 2/2019 | |
| KR | 10-2019-0021837 | A | | 3/2019 | |
| KR | 10-2019-0021838 | A | | 3/2019 | |
| KR | 10-2019-0086350 | A | | 7/2019 | |
| KR | 10-2019-0105812 | A | | 9/2019 | |
| KR | 10-2019-0110826 | A | | 10/2019 | |
| KR | 20190110826 | A | * | 10/2019 | H01B 1/02 |
| KR | 10-2020-0010906 | A | | 1/2020 | |

* cited by examiner

ANTENNA STACK STRUCTURE AND DISPLAY DEVICE INCLUDING THE SAME

CROSS-REFERENCE TO RELATED APPLICATION AND CLAIM OF PRIORITY

The present application is a continuation of application to International Application No. PCT/KR2021/001639 with an International Filing Date of Feb. 8, 2021, which claims the benefit of Korean Patent Applications Nos. 10-2020-0015473 filed on Feb. 10, 2020 and 10-2020-0020767 filed on Feb. 20, 2020 in the Korean Intellectual Property Office (KIPO), the disclosures of which are incorporated by reference herein in their entirety.

BACKGROUND

1. Field

The present invention relates to an antenna stack structure and a display device including the same. More particularly, the present invention relates to an antenna stack structure including an antenna electrode layer and an insulation structure, and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As a dimension of the display device becomes smaller, the antenna may also be disposed at a display area. In this case, a conductive pattern included in the antenna may be recognized by a user to degrade an image quality of the display device.

An optical structure such as a polarizing plate and various sensor structures may be included in the display device. Accordingly, when the antenna is included in the display device, an interference with the optical structure and the sensor structure may be caused.

Additionally, a space for accommodating the antenna may be limited by the optical structure and the sensor structure. When an additional film or structure is formed to insert the antenna, overall thickness and volume of the display device may be increased.

Therefore, a construction of the antenna for obtaining sufficient radiation and gain properties without an interruption of other functional structures in a limited space is required.

For example, Korean Published Patent Application No. 2013-0113222 discloses an antenna structure embedded in a portable terminal, but does not provide an antenna construction for achieving sufficient optical and radiation properties in a display device.

SUMMARY

According to an aspect of the present invention, there is provided an antenna stack structure having improved radiation and optical properties.

According to an aspect of the present invention, there is provided a display device including an antenna stack structure with improved radiation and optical properties.

The above aspects of the present invention will be achieved by one or more of the following features or constructions:

(1) An antenna stack structure, including: a protective layer; and an antenna electrode layer formed directly on a surface of the protective layer, the antenna electrode layer including a first electrode layer and a second electrode layer having a lower reflectance than that of the first electrode layer.

(2) The antenna stack structure according to the above (1), wherein the second electrode layer is formed directly on a bottom surface of the protective layer, and the first electrode layer is formed on the second electrode layer, wherein a top surface of the protective layer corresponds to a visible surface to a user.

(3) The antenna stack structure according to the above (1), wherein the second electrode layer includes a copper-oxygen-containing composite material.

(4) The antenna stack structure according to the above (3), wherein the copper-oxygen-containing composite material further includes an additional metal, and the additional metal includes at least one selected from the group consisting of chromium (Cr), molybdenum (Mo), tungsten (W), magnesium (Mg), calcium (Ca), lanthanum (La), cesium (Ce) and indium (In).

(5) The antenna stack structure according to the above (1), wherein the first electrode layer includes a metal layer.

(6) The antenna stack structure according to the above (5), wherein the first electrode layer has a multi-layered structure of the metal layer and a transparent conductive oxide layer.

(7) The antenna stack structure according to the above (1), further including: a polarizing layer disposed under the antenna electrode layer; and a first adhesive layer formed between the antenna electrode layer and the polarizing layer.

(8) The antenna stack structure according to the above (7), further including a touch sensor layer disposed under the polarizing layer.

(9) The antenna stack structure according to the above (8), further including a second adhesive layer formed between the polarizing layer and the touch sensor layer.

(10) The antenna stack structure according to the above (1), wherein a thickness of the protective layer is less than 100 μm.

(11) An antenna stack structure, including: a polarizing layer; an antenna electrode layer disposed on the polarizing layer, the antenna electrode layer including a first electrode layer and a second electrode layer formed on the first electrode layer, the second electrode layer having a lower reflectance than that of the first electrode layer; and a protective layer disposed on the second electrode layer toward a visible surface to a user.

(12) The antenna stack structure according to the above (11), wherein the second electrode layer includes a copper-oxygen-containing composite material.

(13) The antenna stack structure according to the above (12), wherein the copper-oxygen-containing composite material further includes an additional metal, and the additional metal includes at least one selected from the group consisting of chromium (Cr), molybdenum (Mo), tungsten (W), magnesium (Mg), calcium (Ca), lanthanum (La), cesium (Ce) and indium (In).

(14) The antenna stack structure according to the above (11), wherein the first electrode layer includes a metal layer.

(15) The antenna stack structure according to the above (14), wherein the first electrode layer has a multi-layered structure of the metal layer and a transparent conductive oxide layer.

(16) The antenna stack structure according to the above (11), wherein the antenna electrode layer has a thickness from 1000 to 5000 Å.

(17) The antenna stack structure according to the above (11), further including a base dielectric layer disposed under the polarizing layer.

(18) The antenna stack structure according to the above (11), further including an antenna substrate layer disposed between the polarizing layer and the antenna electrode layer.

(19) A display device, including: a display panel; and the antenna stack structure according to embodiments as described above disposed on the display panel.

According to exemplary embodiments of the present invention, an antenna stack structure may include an antenna electrode layer directly formed on a protective layer. Thus, an adhesive layer for attaching the antenna electrode layer to the protective layer may be omitted, so that a radiation intensity toward a top surface of the protective layer may be further increased.

For example, the adhesive layer may be formed between the antenna electrode layer and a polarizing plate. Accordingly, the adhesive layer may serve as an antenna dielectric layer of the antenna electrode layer together with the polarizing plate. Thus, a sufficient thickness of the antenna dielectric layer may be achieved, thereby preventing signal loss and further improving radiation reliability.

The antenna stack structure according to embodiments of the present invention may include an antenna electrode layer disposed between a protective layer and a polarizing layer. The antenna electrode layer may be disposed under the protective layer serving as, e.g., a window film or a cover glass, so that sensitivity to an external signal may be improved and radiation properties may be also improved. Additionally, the polarization layer may be used as a dielectric layer of the antenna electrode layer, and thus radiation reliability may be further improved while preventing signal loss.

According to exemplary embodiments, the antenna electrode layer may include a first electrode layer and a second electrode layer having a lower reflectivity than that of the first electrode layer. Improved optical and gain properties may be maintained while preventing the antenna electrode layer from being visually recognized to a user by the second electrode layer.

DETAILED DESCRIPTION OF THE EMBODIMENTS

According to exemplary embodiments of the present invention, there is provided an antenna stack structure including a multi-layered antenna electrode layer and a protective layer.

The antenna electrode layer included in the antenna stack structure may be, e.g., a microstrip patch antenna fabricated in the form of a transparent film. The antenna stack structure may be applied to communication devices for a mobile communication of a high or ultrahigh frequency band corresponding to a mobile communication of, e.g., 3G, 4G, 5G or more.

According to exemplary embodiments of the present invention, there is also provided a display device including the antenna stack structure. An application of the antenna stack structure is not limited to the display device, and the antenna stack structure may be applied to various objects or structures such as a vehicle, a home electronic appliance, an architecture, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first" and "second" included in the present application are used to distinguish different components and members, and are not intended to limit an absolute position or order.

Figure 1:
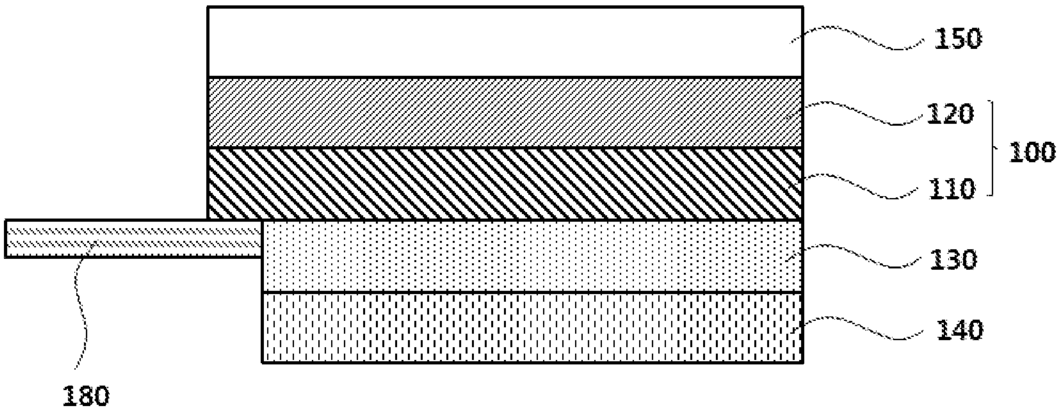
FIG. 1 is a schematic cross-sectional view illustrating an antenna stack structure in accordance with exemplary embodiments.

FIG. 1 is a schematic cross-sectional view illustrating an antenna stack structure in accordance with exemplary embodiments.

Referring to FIG. 1, the antenna stack structure may include a protective layer 150 and an antenna electrode layer 100. The antenna stack structure may further include a polarizing layer 140 disposed under the antenna electrode layer 100.

In exemplary embodiments, the protective layer 150 may serve as, e.g., a window cover, a cover glass (e.g., ultra-thin glass (UTG)), a protective cover film or a protective cover layer of a display device. In this case, the protective layer 150 may provide a visible surface to a user or an outermost surface of the display device.

The protective layer 150 may include, e.g., glass or a flexible resin material such as polyimide, polyethylene terephthalate (PET), acrylic resin, siloxane resin or the like.

In some embodiments, a thickness of the protective layer 150 may be less than about 100 μm. For example, the thickness of the protective layer 150 may be about 10 μm or more and less than about 100 μm. Preferably, the thickness of the protective layer 150 may be about 10 to 50 μm. Disturbance of a radiation axis and a resonance frequency through the antenna electrode layer 100 may be prevented within the thickness range.

The antenna electrode layer 100 may be disposed under the protective layer 150. For example, the antenna electrode layer 100 may be stacked on an inner surface (e.g., a bottom surface) opposite to the visible surface (e.g., a top surface) of the protective layer 150.

The antenna electrode layer 100 may include a first electrode layer 110 and a second electrode layer 120. In exemplary embodiments, the second electrode layer 120 may be closer to the visible surface or the protective layer 150 than the first protective layer 110, and may contain a conductive material having a lower reflectance than that of the first electrode layer 110.

For example, the first electrode layer 110 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy containing at least one of the metals. These may be used alone or in combination thereof.

For example, the first electrode layer 110 may include silver (Ag) or a silver alloy (e.g., silver-palladium-copper (APC)), or copper (Cu) or a copper alloy (e.g., a copper-calcium (CuCa)) to implement a low resistance and a fine patterning.

In some embodiments, the first electrode layer 110 may include a transparent conductive oxide such as indium tin oxide (ITO), indium zinc oxide (IZO), indium zinc tin oxide (ITZO), tin oxide (SnOx), zinc oxide (ZnOx), etc.

For example, the first electrode layer 110 may have a multi-layered structure including a metal or alloy layer, and a transparent metal oxide layer. In some embodiments, the first electrode layer 110 may include a double-layered structure of a transparent conductive oxide layer-metal layer or a triple-layered structure of a first transparent conductive oxide layer-metal layer-second transparent conductive oxide layer.

The first electrode layer 110 may be formed on the second electrode layer 120. In exemplary embodiments, the first electrode layer 110 may be formed directly on a surface of the second electrode layer 120.

As described above, the second electrode layer 120 may include a conductive material having a lower reflectance than that of the first electrode layer 110. For example, the second electrode layer 120 may substantially serve as a blackened layer.

In some embodiments, the second electrode layer 120 may include a copper-oxygen-containing conductive composite material. In some embodiments, the second electrode layer 120 may further contain an additional metal M different from copper.

The additional metal M may include, e.g., chromium (Cr), molybdenum (Mo), tungsten (W), magnesium (Mg), calcium (Ca), lanthanum (La), cesium (Ce), indium (In), etc. These may be used alone or in combination thereof.

In an embodiment, in consideration of improving a transmittance through the antenna electrode layer 100, the additional metal M may include indium. In this case, the second electrode layer 120 may include a copper-indium-oxygen (Cu—In—O) composite or a composite of a copper-oxygen-containing compound and an indium-oxygen-containing compound.

In the second electrode layer 120, an oxygen element may be doped or incorporated into the second electrode layer 120 without a loss of a conductivity of copper and/or the additional metal M. The second electrode layer 120 may be blackened or partially oxidized by the oxygen element to provide an anti-reflection layer for the first electrode layer 110.

For example, the second electrode layer 120 may be formed through a sputtering process using a copper target (or a copper-oxygen target) and an additional metal target (or an additional metal-oxygen target), or a copper-addition metal-oxygen target.

In an embodiment, the antenna electrode layer 100 may be formed as a mesh structure. The antenna electrode layer 100 may include an antenna unit 105, and elements and structures of the antenna unit 105 will be described in more detail with reference to FIG. 5.

In some embodiments, a thickness of the antenna electrode layer 100 may be about 5000 Å or less, and preferably from about 1000 to 5000 Å. Within the above range, a color shift phenomenon on the visible surface of the antenna stack structure may be suppressed while preventing an increase in resistance of the antenna electrode layer 100.

In exemplary embodiments, the antenna electrode layer 100 may be formed directly on the protective layer 150. The protective layer 150 may serve as an antenna substrate for forming the antenna electrode layer 100.

For example, the second electrode layer 120 may be directly formed on the bottom surface of the protective layer 150 by the above-described sputtering process. Subsequently, the first electrode layer 110 may be formed on the second electrode layer 120.

As described above, a top surface of the antenna electrode layer 100 may directly contact the protective layer 150. In some embodiments, a bottom surface of the antenna electrode layer 100 may be combined with the polarizing layer 140.

The polarizing layer 140 may include a coating type polarizer or a polarizing plate. The coating type polarizer may include a liquid crystal coating layer including a polymerizable liquid crystal compound and a dichroic dye. In this case, the polarizing layer 140 may further include an alignment layer for an orientation of the liquid crystal coating layer.

For example, the polarizing plate may include a polyvinyl alcohol-based polarizer and a protective film attached to at least one surface of the polyvinyl alcohol-based polarizer.

A first adhesive layer 130 may be disposed between the polarizing layer 140 and the antenna electrode layer 100. For example, the first adhesive layer 130 may be formed on a surface of the first electrode layer 110 or the polarizing layer 140, and then the antenna electrode layer 100 and the polarizing layer 140 may be attached to each other. The first adhesive layer 130 may include, e.g., a pressure-sensitive adhesive (PSA) or an optically clear adhesive (OCA) including an acrylic resin, a silicone resin, an epoxy resin, or the like.

An end portion of the antenna electrode layer 100 may be electrically connected to a circuit connection structure 180. The circuit connection structure 180 may include, e.g., a flexible printed circuit board (FPCB).

According to the above-described exemplary embodiments, the antenna electrode layer 100 may be disposed between the polarizing layer 140 and the protective layer 150. Accordingly, the antenna electrode layer 100 may be disposed to be closer to the visible surface or the outer surface of the display device, so that radiation intensity and sensitivity may be further improved.

Additionally, the polarizing layer 140 may be disposed under the antenna electrode layer 100 and may serve as an antenna dielectric layer for the antenna electrode layer 100 together with the first adhesive layer 130.

In a comparative example, the polarizing layer 140 may be attached to the protective layer 150 through an adhesive layer, the antenna electrode layer 100 may be disposed under the polarizing layer 140, and an antenna substrate layer may be disposed under the antenna electrode layer 100. In this case, the antenna substrate layer may substantially serve as a single antenna dielectric layer.

However, according to exemplary embodiments, the antenna substrate layer may be omitted and the antenna electrode layer 100 may be directly formed on the protective layer 150, so that a thickness of the entire stack structure may be reduced. Further, the first adhesive layer 130 and the polarizing layer 140 may serve as the antenna dielectric layer, so that a total thickness of the antenna dielectric layer may be increased.

According to the above-described exemplary embodiments, a sufficient thickness of the antenna dielectric layer for the antenna electrode layer 100 may be achieved. Thus, for example, radiation independence and radiation efficiency through the antenna electrode layer 100 may be improved while preventing signal loss and signal interference from electrodes and wirings included in a display panel to which the antenna stack structure is applied.

The antenna electrode layer 100 may be adjacent to a viewing surface, so that a light reflection and an electrode visibility that may occur from the viewing surface may be reduced by the second electrode layer 120. Accordingly, the antenna stack structure having improved optical and antenna radiation properties may be implemented.

Figure 2:
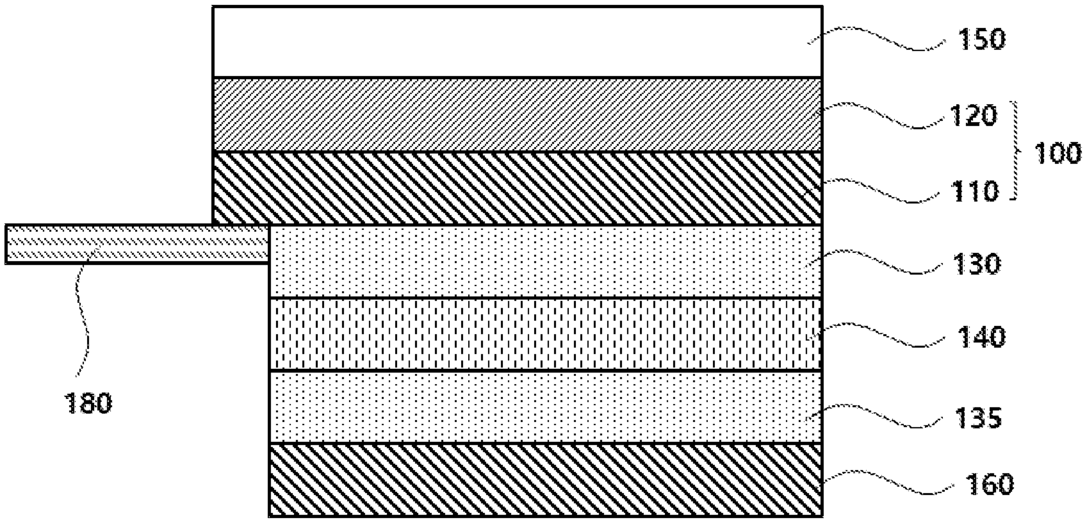
FIG. 2 is a schematic cross-sectional view illustrating an antenna stack structure in accordance with some exemplary embodiments.

FIG. 2 is a schematic cross-sectional view illustrating an antenna stack structure in accordance with some exemplary embodiments. Detailed descriptions on elements and structures substantially the same as or similar to those described with reference to FIG. 1 are omitted.

Referring to FIG. 2, the antenna stack structure may further include a touch sensor layer 160. The touch sensor layer 160 may include, e.g., capacitive sensing electrodes. For example, column direction sensing electrodes and row direction sensing electrodes may be arranged to cross each other. The touch sensor layer 160 may further include traces connecting the sensing electrodes and the driving IC chip to each other. The touch sensor layer 160 may further include a substrate on which the sensing electrodes and the traces are formed.

The touch sensor layer 160 may be combined with the polarizing layer 140 through the second adhesive layer 135. In this case, the second adhesive layer 135 may also serve as an antenna dielectric layer together with the first adhesive layer 130 and the polarizing layer 140.

The sensing electrodes and/or traces included in the touch sensor layer 160 may function as an antenna ground layer for the antenna electrode layer 100 (e.g., a radiator 102).

As described above, a sufficient thickness of the antenna dielectric layer may be obtained between the antenna electrode layer 100 and the touch sensor layer 160, so that a signal absorption and a gain reduction by the sensing electrodes and/or traces may be prevented while maintaining a function of the antenna ground layer.

Figure 3:
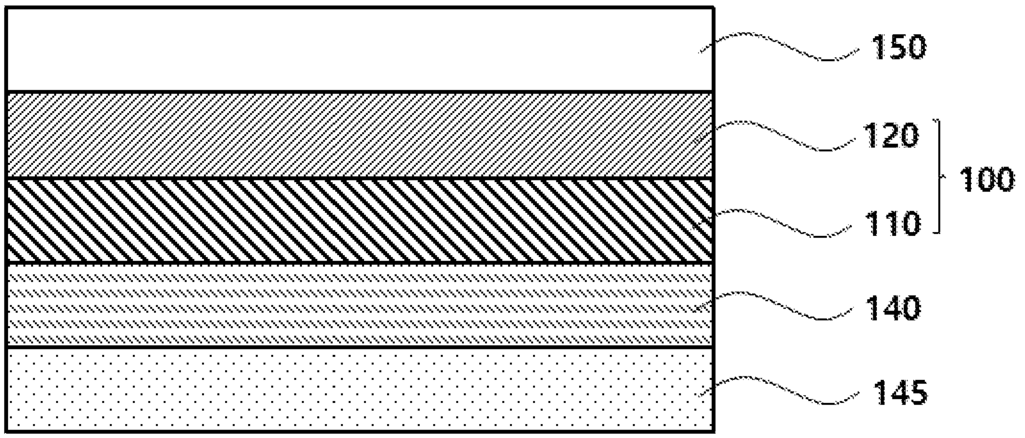
FIG. 3 is a schematic cross-sectional view illustrating an antenna stack structure in accordance with exemplary embodiments.

FIG. 3 is a schematic cross-sectional view illustrating an antenna stack structure in accordance with exemplary embodiments. Detailed descriptions on elements and structures substantially the same as or similar to those described with reference to FIG. 1 are omitted.

Referring to FIG. 3, as described with reference to FIG. 1, the antenna stack structure may include a protective layer 150, an antenna electrode layer 100 and a polarizing layer 140. As described above, the antenna electrode layer 100 may include a first electrode layer 110 and a second electrode layer 120. The antenna electrode layer 100 may be disposed between the protective layer 150 and the polarizing layer 140.

In some embodiments, a base dielectric layer 145 may be disposed under the polarizing layer 140.

The base dielectric layer 145 may include an insulating material having a predetermined dielectric constant. The base dielectric layer 145 may include, e.g., an inorganic insulating material such as glass, silicon oxide, silicon nitride, or metal oxide, or an organic insulating material such as an epoxy-based resin, an acrylic resin or an imide-based resin.

For example, a transparent film may be used as the base dielectric layer 145. For example, the transparent film may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

In some embodiments, an adhesive film such as an optically clear adhesive (OCA), an optically clear resin (OCR), or the like may be included in the base dielectric layer 145.

In some embodiments, a dielectric constant of the base dielectric layer 145 may be adjusted in a range from about 1.5 to about 12. When the dielectric constant exceeds about 12, a driving frequency may be excessively decreased, so that driving in a desired high frequency band may not be implemented.

According to the above-described exemplary embodiments, the antenna electrode layer 100 may be disposed between the polarizing layer 140 and the protective layer 150. Accordingly, the antenna electrode layer 100 may be closer to the visible surface or the outer surface of the display device, so that radiation intensity and sensitivity may be further improved.

Further, the polarizing layer 140 may be disposed under the antenna electrode layer 100 to provide a dielectric layer for the antenna electrode layer 100. In some embodiments, the polarizing layer 140 may serve as a dielectric layer for the antenna electrode layer 100 together with the base dielectric layer 145

Therefore, when compared to a case where the antenna electrode layer 100 is disposed under the polarizing layer 140 and the base dielectric layer 145 is disposed under the antenna electrode layer 100, a thickness of the entire dielectric layer for the antenna electrode layer 100 may be increased while maintaining a thickness of the entire stack structure.

As described above, according to exemplary embodiments, a sufficient thickness of the dielectric layer for the antenna electrode layer 100 may be achieved. Thus, for example, a radiation independence and a radiation efficiency through the antenna electrode layer 100 may be improved while preventing a signal loss and a signal interference from electrodes and wirings included in the display panel on which the antenna stack structure is employed.

The antenna electrode layer 100 may be adjacent to the viewing surface, so that light reflection and electrode visibility that may occur from the viewing surface may be reduced by the second electrode layer 120. Accordingly, the antenna stack structure having improved optical and antenna radiation properties may be implemented.

Figure 4:
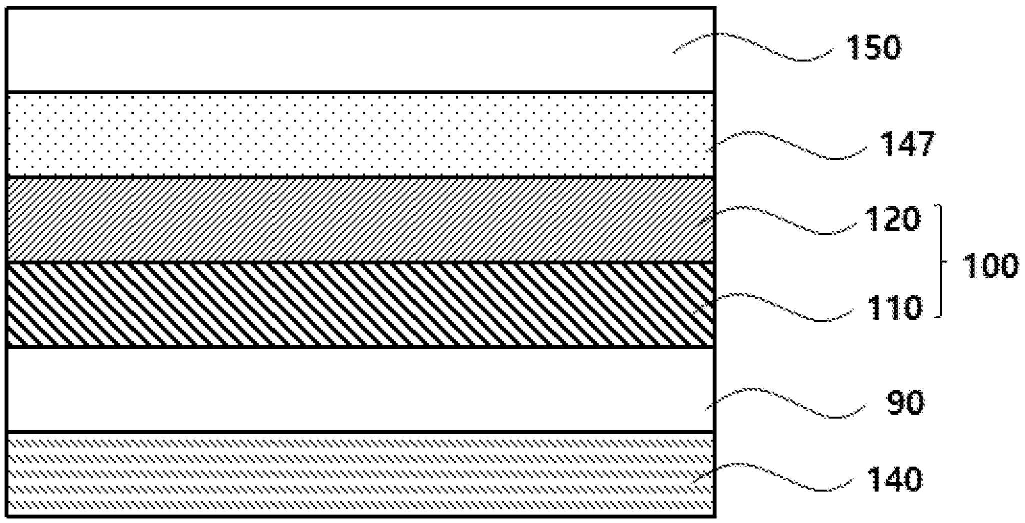
FIG. 4 is a schematic cross-sectional view illustrating an antenna stack structure in accordance with some exemplary embodiments.

FIG. 4 is a schematic cross-sectional view illustrating an antenna stack structure in accordance with some exemplary embodiments. Detailed descriptions of elements and structures substantially the same as or similar to those described with reference to FIG. 3 are omitted.

Referring to FIG. 4, the antenna electrode layer 100 may be attached to the protective layer 150 through an adhesive layer 147. The adhesive layer 147 may include, e.g., a pressure-sensitive adhesive (PSA) or an optically clear adhesive (OCA) including an acrylic resin, a silicone resin, or the like.

The antenna electrode layer 100 may be formed on an antenna substrate layer 90. The antenna substrate layer 90 may serve as a substrate or a base layer for deposition and etching processes of the antenna electrode layer 100.

The antenna substrate layer 90 may serve as an antenna dielectric layer together with the polarization layer 140. Accordingly, a thickness of the antenna dielectric layer may be additionally increased.

The antenna substrate layer 90 may include an insulating film material commonly used in a display manufacturing process. For example, the antenna substrate layer 90 may include a material substantially the same as or similar to that of the base dielectric layer 145 as described with reference to FIG. 3.

As described with reference to FIG. 3, the base dielectric layer 145 may be further included under the polarizing layer 140.

Figure 5:
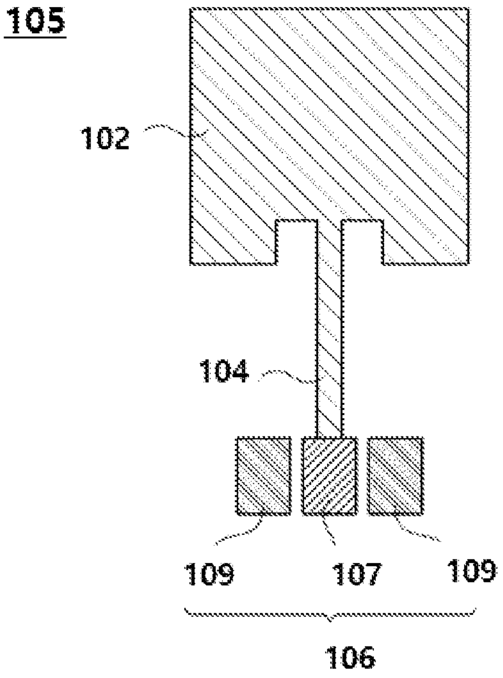
FIG. 5 is a schematic cross-sectional view illustrating a construction of an antenna unit included in an antenna stack structure in accordance with exemplary embodiments.

FIG. 5 is a schematic cross-sectional view illustrating a construction of an antenna unit included in an antenna stack structure in accordance with exemplary embodiments.

Referring to FIG. 5, an antenna unit 105 may include a radiator 102, a transmission line 104 and a pad 106.

The radiator 102 may have, e.g., a polygonal plate shape, and the transmission line 104 may extend from one side of the radiator 102 to be electrically connected to a signal pad 107. The transmission line 104 may be formed as a single member substantially integral with the radiator 102.

In some embodiments, the pad 106 may include the signal pad 107 and may further include a ground pad 109. For example, a pair of the ground pads 109 may be disposed with the signal pad 107 interposed therebetween. The ground pads 109 may be electrically separated from the signal pad 107 and the transmission line 104.

In an embodiment, the ground pad 109 may be omitted. Further, the signal pad 107 may be formed as an integral member at an end of the transmission line 104.

The pad 107 may be electrically connected to an antenna driving integrated circuit (IC) chip through, e.g., the circuit connection structure 180 (see FIG. 1) such as a flexible printed circuit board. Accordingly, a feeding and driving control to the antenna unit 105 may be performed through the antenna driving IC chip.

Figure 6:
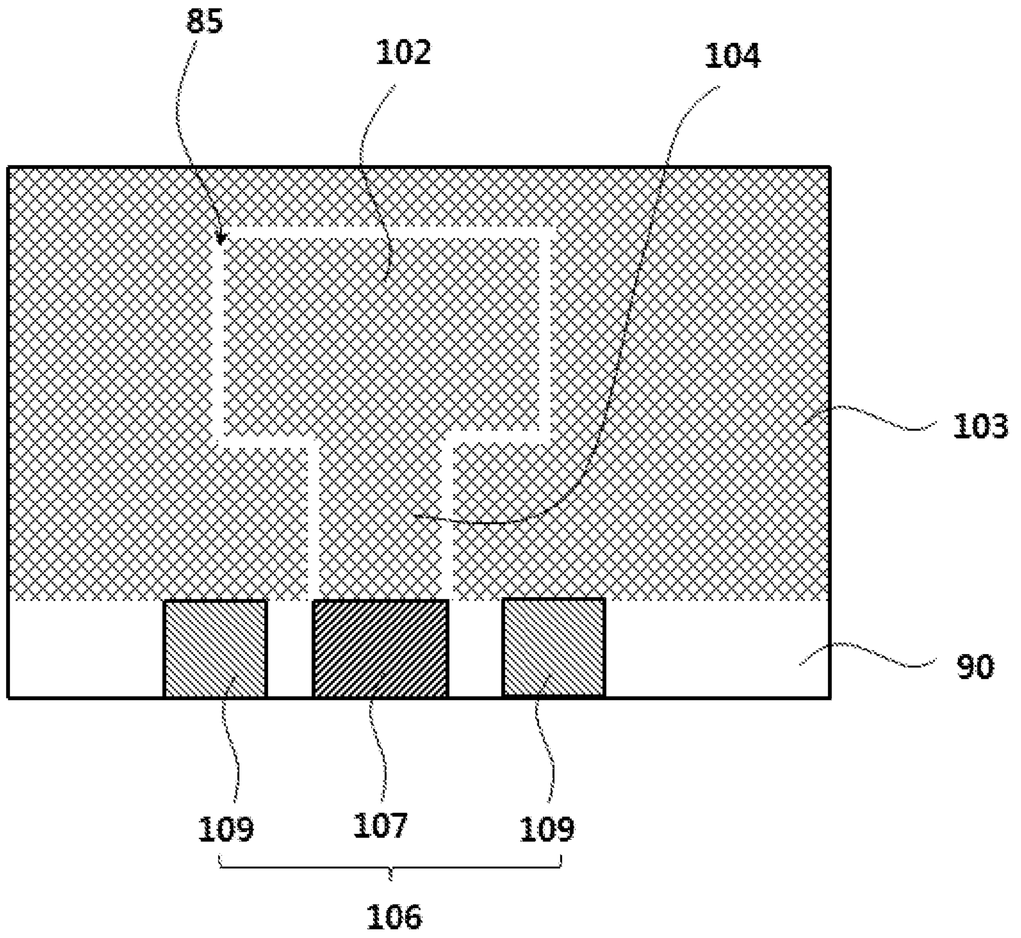
FIG. 6 is a schematic cross-sectional view illustrating a construction of an antenna unit included in an antenna stack structure in accordance with some exemplary embodiments.

FIG. 6 is a schematic cross-sectional view illustrating a construction of an antenna unit included in an antenna stack structure in accordance with some exemplary embodiments.

Referring to FIG. 6, the radiator 102 may have a mesh structure. In some embodiments, the transmission line 104 connected to the radiator 102 may also have a mesh structure.

The radiator 102 may include a mesh structure, so that transmittance may be improved even when the radiator 102 is disposed in a display area of a display device, thereby preventing an electrode visibility and deterioration of an image quality.

A dummy mesh pattern 103 may be disposed around the radiator 102 and the transmission line 104. The dummy mesh pattern 103 may be electrically and physically spaced apart from the radiator 102 and the transmission line 104 by a separation region 85.

For example, as described above, the antenna electrode layer 100 including the first electrode layer 110 and the second electrode layer 120 may be formed on the antenna substrate layer 90. Thereafter, the antenna electrode layer 100 may be etched to form a mesh structure, and the separation region 85 may be formed by partially etching along a profile of the radiator 102 and the transmission line 104. Accordingly, a portion of the antenna electrode layer 100 may be converted into the dummy mesh pattern 103.

In some embodiments, the pad 106 may be formed as a solid structure to reduce a feeding resistance. For example, the pad 106 may be disposed in a non-display area or a light-shielding area of the display device to be bonded or connected to the flexible circuit board and/or the antenna driving IC chip.

Accordingly, the pad 106 may be disposed at an outside of a user's viewing area. In an embodiment, the pad 106 may be formed of a metal or an alloy. In an embodiment, the pad 106 may not include the second electrode layer 120.

In an embodiment, at least a portion of the transmission line 104 also has a solid structure, and may be disposed in a non-display area together with the pad 106.

Figure 7:
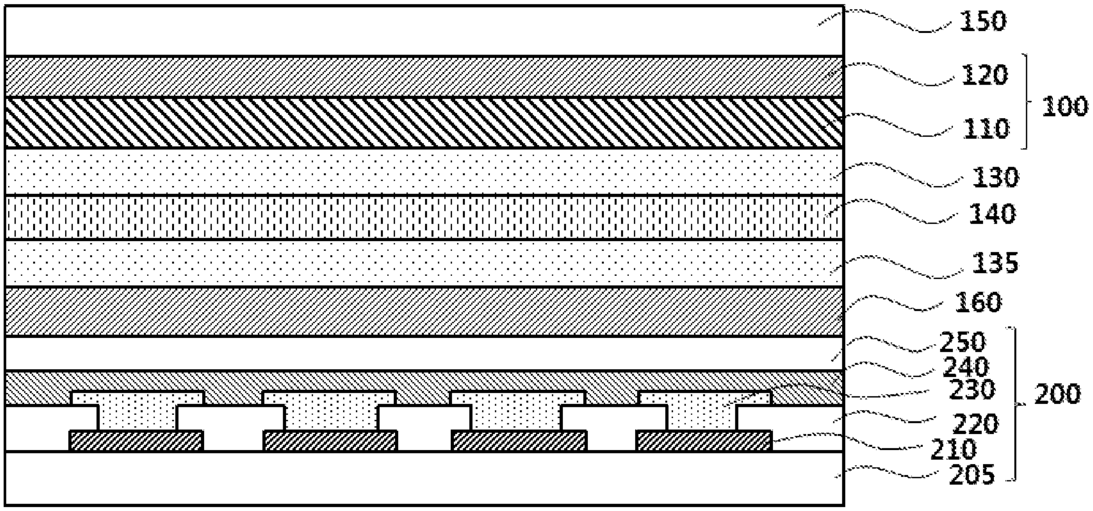
FIG. 7 is a schematic cross-sectional view in accordance with exemplary embodiments.

FIG. 7 is a schematic cross-sectional view in accordance with exemplary embodiments.

Referring to FIG. 7, the antenna stack structure as described above may be stacked on a display panel 200.

The display panel 200 may include a pixel electrode 210, a pixel defining layer 220, a display layer 230, an opposing electrode 240 and an encapsulation layer 250 disposed on a panel substrate 205.

A pixel circuit including a thin film transistor TFT may be formed on the panel substrate 205, and an insulating layer may be formed to cover the pixel circuit. The pixel electrode 210 may be electrically connected to, e.g., a drain electrode of a TFT on the insulating layer.

The pixel defining layer 220 may be formed on the insulating layer to expose the pixel electrode 210 to define a pixel region. The display layer 230 may be formed on the pixel electrode 210, and the display layer 230 may include, e.g., a liquid crystal layer or an organic light-emitting layer. Preferably, the display layer 230 may include the organic light-emitting layer, and the display panel 200 may be an OLED panel.

The opposing electrode 240 may be disposed on the pixel defining layer 220 and the display layer 230. The opposing electrode 240 may serve as, e.g., a common electrode or a cathode of a display device. The encapsulation layer 250 for protecting the display panel 200 may be stacked on the opposing electrode 240.

The above-described antenna stack structure may be stacked on the display panel 200, so that the touch sensor layer 160, the polarizing layer 140 and the antenna electrode layer 100 may be sequentially stacked from the display panel 200.

The adhesive layers 130 and 135 and the polarizing layer 140 may serve together as an antenna dielectric layer, so that a signal absorption and a signal loss by electrodes and wirings included in the touch sensor layer 160 and the display panel 200 may be prevented while achieving sufficient inductance or capacitance for driving the antenna.

Additionally, the polarization layer 140 may be disposed on the touch sensor layer 160, so that light reflection and electrode visual recognition of sensing electrodes included in the touch sensor layer 160 may be reduced.

As described above, the antenna electrode layer 100 may be disposed to be adjacent to the protective layer 150 that may be provided as, e.g., a window cover, so that signal sensitivity and gain amount may be enhanced and light reflectance may be reduced by the second electrode layer 120 to prevent a visual recognition of the antenna electrode layer 100.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

EXPERIMENTAL EXAMPLE 1: EVALUATION OF ELECTRODE VISUAL RECOGNITION

Example 1

A polarizing plate (thickness: 98 μm) including a PVA polarizer and a triacetyl cellulose (TAC) protective film formed on both sides of the polarizer was prepared. A first electrode layer formed of APC was formed on the polarizing plate, and a $CuO+In_2O_3$ second electrode layer was formed on the first electrode layer by a sputtering process. The first electrode layer and the second electrode layer had a thickness of 2000 Å and 300 Å, respectively.

The antenna electrode layer including the first electrode layer and the second electrode layer was etched into a mesh structure having a line width of 1.8 μm, and a glass cover (thickness: 500 μm) was attached on the antenna electrode layer.

Example 2

An antenna stack was manufactured by the same method as that in Example 1, except that a line width of the mesh structure in the antenna electrode layer was formed as 3 μm.

Comparative Example

An antenna stack structure was manufactured by the same method as that in Example 2, except that positions of the antenna electrode layer and the polarizing plate were changed (i.e., the antenna electrode layer-polarizing plate-glass cover stack structure), and the second electrode layer was omitted from the antenna electrode layer.

10 panels observed the antenna stack structures of Examples and Comparative Example over the glass cover to determine whether patterns included in the antenna electrode layer were visually recognized by the following grades.

i) grade 0: electrodes were completely non-visible
ii) grade 1: recognized by 1-2 panels
iii) grade 2: recognized by 3-4 panels
iv) grade 3: recognized by 5-6 panels
v) grade 4: recognized by 7-9 panels
vi) grade 5: recognized by 10 panels Example 1 was evaluated as grade 0, Example 2 was evaluated as grade 1, and Comparative Example was evaluated as grade 3.

EXPERIMENTAL EXAMPLE 2: EVALUATION OF COLOR SHIFT

A total thickness of the antenna electrode layer was adjusted by changing a thickness of the first electrode layer in the antenna stack structure of Example 1 used in Experimental Example 1. While changing the total thickness of the antenna electrode layer, a color shift generation was evaluated when observed over the glass cover.

When R, G and B chromaticity coordinate values according to the thickness of the electrode layer measured using a colorimeter (OPS-200, manufactured by Olympus) was deviated from reference values, it was determined that a color shift occurred.

Specifically, (R: 0.683, 0.314), (G: 0.249, B: 0.701), and (B: 0.136, 0.052) were set as the reference values for color coordinates, and it was determined that a color shift occurred when the measured values were not within a range of ±0.005 from the reference values.

The evaluation results are shown in Table 1 below.

TABLE 1

| A total thickness of antenna electrode layer | Color Shift |
|---|---|
| 1000 Å | Not Occur |
| 2500 Å | Not Occur |
| 5000 Å | Not Occur |
| 5500 Å | Occur |
| 6000 Å | Occur |

Referring to Table 1, a color shift occurred as the thickness of the antenna electrode layer exceeded about 5000 Å. From the above results, it may be predicted that when the antenna electrode layer is formed to have a thickness from, e.g., 1000 to 5000 Å, image deterioration and electrode visibility due to the color shift may be suppressed while sufficiently lowering a resistance.

EXPERIMENTAL EXAMPLE 3: EVALUATION OF AN ANTENNA OPERATION ACCORDING TO A THICKNESS OF A PROTECTIVE LAYER (COVER GLASS)

A $CuO+In_2O_3$ second electrode layer was formed on a protective cover film formed of glass by a sputtering process, and a first electrode layer including APC was formed on the second electrode layer. The first electrode layer and the second electrode layer had a thickness of 2400 Å and 300 Å, respectively.

A polarizing plate (thickness: 98 μm) including a PVA polarizer and a triacetyl cellulose (TAC) protective film formed on both sides of the polarizer was prepared. The polarizing plate was attached to the second electrode layer using a commercially available OCA film (thickness: 100 μm).

While changing the thickness of the cover glass, the antenna stack structure samples shown in Table 2 were prepared. An angle of a radiation axis and a resonance frequency of the sample (thickness 0) from which the cover glass was omitted were used as reference values.

Power was applied to the antenna electrode layer, and a tilting angle for a main resonance frequency was detected in a range of a tilting angle of the radiation axis from 90° to 180° and in a resonance frequency from 0 to 40 GHz using a communication module (Anoki Board).

The evaluation results are shown in Table 2 below.

TABLE 2

| Glass Thickness (μm) | Tilting Angle (°) of radiation axis | Resonance Frequency (GHz) |
|---|---|---|
| 0 | 180 | 31.3 |
| 10 | 179 | 29.7 |
| 30 | 178 | 29.0 |
| 50 | 176 | 28.1 |
| 70 | 170 | 27.9 |
| 90 | 168 | 27.7 |
| 95 | 167 | 27.5 |
| 100 | 122 | 27.3 |
| 150 | 125 | 24.3 |
| 500 | 126 | 23.1 |

Referring to Table 2, the OCA layer and the polarizing plate were provided together as an antenna dielectric layer, so that a substantially complete vertical radiation (tilting angle 180°) and high-frequency radiation properties were realized when the cover glass was omitted.

When the thickness of the cover glass exceeded 100 μm, the tilting angle of the radiation axis was excessively changed and a shift of the resonance frequency was intensified.

What is claimed is:

1. An antenna stack structure, comprising:

a protective layer including a top surface that corresponds to a visible surface to a user and a bottom surface opposite to the top surface, the protective layer serving as a window cover or a cover glass of a display device; and an antenna electrode layer formed directly on a surface of the protective layer, the antenna electrode layer including a first electrode layer and a second electrode layer having a lower reflectance than that of the first electrode layer, wherein the second electrode layer is formed directly on the bottom surface of the protective layer, and the first electrode layer is formed directly on a bottom surface of the second electrode layer.

2. The antenna stack structure according to claim 1, wherein the second electrode layer includes a copper-oxygen-containing composite material.

3. The antenna stack structure according to claim 2, wherein the copper-oxygen-containing composite material further includes an additional metal, and the additional metal includes at least one selected from the group consisting of chromium (Cr), molybdenum (Mo), tungsten (W), magnesium (Mg), calcium (Ca), lanthanum (La), cesium (Ce) and indium (In).

4. The antenna stack structure according to claim 1, wherein the first electrode layer comprises a metal layer.

5. The antenna stack structure according to claim 4, wherein the first electrode layer has a multi-layered structure of the metal layer and a transparent conductive oxide layer.

6. The antenna stack structure according to claim 1, further comprising:

a polarizing layer disposed under the antenna electrode layer; and a first adhesive layer formed between the antenna electrode layer and the polarizing layer.

7. The antenna stack structure according to claim 6, further comprising a touch sensor layer disposed under the polarizing layer.

8. The antenna stack structure according to claim 7, further comprising a second adhesive layer formed between the polarizing layer and the touch sensor layer.

9. The antenna stack structure according to claim 1, wherein a thickness of the protective layer is less than 100 μm.

10. A display device, comprising:

a display panel; and the antenna stack structure of claim 1 disposed on the display panel.

11. An antenna stack structure, comprising:

a polarizing layer;

an antenna electrode layer disposed on the polarizing layer, the antenna electrode layer including a first electrode layer and a second electrode layer formed directly on the first electrode layer, the second electrode layer having a lower reflectance than that of the first electrode layer; and a protective layer directly disposed on the second electrode layer, wherein a top surface of the protective layer corresponds to a visible surface to a user, and the protective layer serves as a window cover or a cover glass of a display device.

12. The antenna stack structure according to claim 11, wherein the second electrode layer includes a copper-oxygen-containing composite material.

13. The antenna stack structure according to claim 12, wherein the copper-oxygen-containing composite material further includes an additional metal, and the additional metal includes at least one selected from the group consisting of chromium (Cr), molybdenum (Mo), tungsten (W), magnesium (Mg), calcium (Ca), lanthanum (La), cesium (Ce) and indium (In).

14. The antenna stack structure according to claim 11, wherein the first electrode layer comprises a metal layer.

15. The antenna stack structure according to claim 14, wherein the first electrode layer has a multi-layered structure of the metal layer and a transparent conductive oxide layer.

16. The antenna stack structure according to claim 11, wherein the antenna electrode layer has a thickness from 1000 to 5000 Å.

17. The antenna stack structure according to claim 11, further comprising a base dielectric layer disposed under the polarizing layer.

18. The antenna stack structure according to claim 11, further comprising an antenna substrate layer disposed between the polarizing layer and the antenna electrode layer.

* * * * *